US009142162B2

(12) United States Patent
Kwack et al.

(10) Patent No.: US 9,142,162 B2
(45) Date of Patent: Sep. 22, 2015

(54) FLEXIBLE DISPLAY APPARATUS THAT ADJUSTS IMAGE SIZE AND RESOLUTION ACCORDING TO FOLDING THEREOF

(75) Inventors: Jun-Ho Kwack, Yongin (KR); Young-Sik Kim, Yongin (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 245 days.

(21) Appl. No.: 13/616,993

(22) Filed: Sep. 14, 2012

(65) Prior Publication Data

US 2013/0342439 A1    Dec. 26, 2013

(30) Foreign Application Priority Data

Jun. 22, 2012   (KR) ................ 10-2012-0067300

(51) Int. Cl.
G09G 3/32 (2006.01)
G06F 1/18 (2006.01)
G06F 3/041 (2006.01)
G09F 9/30 (2006.01)
G06F 1/16 (2006.01)

(52) U.S. Cl.
CPC ............ *G09G 3/3225* (2013.01); *G06F 1/1652* (2013.01); *G06F 3/0412* (2013.01); *G09F 9/301* (2013.01); *G06F 2203/04102* (2013.01); *G09G 2340/0407* (2013.01); *G09G 2354/00* (2013.01)

(58) Field of Classification Search
CPC .......... G06F 2203/04102; G06F 3/041; G06F 3/0412; G06F 1/1641; G06F 1/1652; G09F 9/301; G09G 2340/0407; G09G 3/3225; G09G 2340/00; G09G 2354/00

USPC ........................................................... 345/698
See application file for complete search history.

(56) References Cited

U.S. PATENT DOCUMENTS

| 7,779,697 | B2 * | 8/2010 | Nitecki ........................... 73/706 |
| 2002/0054267 | A1 * | 5/2002 | Matsumoto et al. .......... 349/155 |
| 2006/0274036 | A1 * | 12/2006 | Hioki et al. .................... 345/156 |
| 2007/0069206 | A1 * | 3/2007 | Lee et al. .......................... 257/40 |
| 2007/0085845 | A1 * | 4/2007 | Kikuchi et al. ............... 345/204 |
| 2008/0036137 | A1 * | 2/2008 | Moteki et al. ................. 271/228 |
| 2008/0291225 | A1 | 11/2008 | Arneson |
| 2009/0085866 | A1 * | 4/2009 | Sugahara ....................... 345/156 |
| 2010/0117809 | A1 | 5/2010 | Dai et al. |
| 2010/0328255 | A1 * | 12/2010 | Ishizaki et al. ............... 345/174 |

(Continued)

FOREIGN PATENT DOCUMENTS

KR    10-2009-0087303 A    8/2009
KR    10-2010-0028343 A    3/2010

(Continued)

OTHER PUBLICATIONS

Korean Office Action dated Oct. 22, 2013.

*Primary Examiner* — Larry Sternbane
(74) *Attorney, Agent, or Firm* — Lee & Morse, P.C.

(57) ABSTRACT

A flexible display apparatus includes a substrate that is flexible and is foldable according to an intention of a user, the substrate including a display area, wherein a size of the substrate is variable according to a folding thereof, a deformation sensing unit that is in an overlapping relationship with the display area and that senses deformation of the substrate, a control unit obtaining information from the deformation sensing unit, and a resolution adjusting unit that is controlled by the control unit and adjusts a resolution of an image displayed on the display area.

26 Claims, 10 Drawing Sheets

(56) References Cited

U.S. PATENT DOCUMENTS

| | | | |
|---|---|---|---|
| 2011/0173080 A1* | 7/2011 | Kutsumi et al. | 705/14.73 |
| 2012/0047024 A1* | 2/2012 | Urban et al. | 705/14.69 |
| 2012/0313862 A1* | 12/2012 | Ko et al. | 345/173 |
| 2012/0313987 A1* | 12/2012 | Nakamura et al. | 345/694 |
| 2013/0234951 A1* | 9/2013 | Kim et al. | 345/173 |
| 2014/0152555 A1* | 6/2014 | Kim et al. | 345/156 |

FOREIGN PATENT DOCUMENTS

| | | |
|---|---|---|
| KR | 10-2011-0082359 A | 9/2010 |
| KR | 10-2011-0082359 A | 7/2011 |
| KR | 10-2011-0088565 A | 8/2011 |

\* cited by examiner

FLEXIBLE DISPLAY APPARATUS THAT ADJUSTS IMAGE SIZE AND RESOLUTION ACCORDING TO FOLDING THEREOF

CROSS-REFERENCE TO RELATED PATENT APPLICATION

This application claims the benefit under 35 U.S.C. §119 of Korean Patent Application No. 10-2012-0067300, filed on Jun. 22, 2012, in the Korean Intellectual Property Office, the disclosure of which is incorporated herein in its entirety by reference.

BACKGROUND

1. Field

Embodiments relate to a flexible display apparatus.

2. Description of the Related Art

At present, display apparatuses are thin, flat, and portable. Recently, flexible display apparatuses, which are bendable or foldable, have drawn attention.

SUMMARY

Embodiments are directed to a flexible display apparatus including a substrate that is flexible and is foldable according to an intention of a user, the substrate including a display area, wherein a size of the substrate is variable according to a folding thereof, a deformation sensing unit that is in an overlapping relationship with the display area and that senses deformation of the substrate, a control unit obtaining information from the deformation sensing unit, and a resolution adjusting unit that is controlled by the control unit and that adjusts a resolution of an image displayed on the display area.

A size of the display area may be varied according to the size of the substrate. When the size of the display area is varied, an aspect ratio of an image displayed on the display area may be maintained constant.

The control unit may detect a substantially varied size of the substrate according to the folding thereof based on information received from the deformation sensing unit. The control unit may determine a size of the display area and a resolution corresponding to the size of the display area in accordance with the substantially varied size of the substrate and transmits information about the size and the resolution of the display area to the resolution adjusting unit. The control unit may transmit information about the substantially varied size of the substrate to the resolution adjusting unit. The resolution adjusting unit may determine a size of the display area and a resolution corresponding to the size of the display area so as to correspond to the substantially varied size of the substrate and adjusts the resolution of the display area according to the determined resolution.

The deformation sensing unit may include a plurality of sensing members that are spaced apart from one another. The plurality of sensing members may have different lengths. The lengths of the plurality of sensing members may gradually increase in a predetermined direction.

The control unit may determine a substantial size of the display area after the substrate is in a folded state, based on information about deformation of the substrate sensed by each of the plurality of sensing members. The plurality of sensing members may have respective lengths along a horizontal direction of the substrate, and may be spaced apart from one another along a vertical direction of the substrate. The plurality of sensing members may have respective lengths along a vertical direction of the substrate, and may be spaced apart from one another along a horizontal direction of the substrate.

The plurality of sensing members may extend up to an edge of the substrate.

The deformation sensing unit may have a single form.

When the substrate is deformed into a folded state, the control unit may determine the substantial size of the substrate after the substrate is in the folded state, according to a degree of deformation sensed by the deformation sensing unit. The deformation sensing unit may have variable widths along a direction perpendicular to an edge of the substrate. The widths vary according to regions of the substrate.

The widths of the deformation sensing unit may gradually increase in a predetermined direction from one corner to another corner of the edge of the substrate. The deformation sensing unit may correspond to an edge of the substrate and another edge adjacent to the edge. The deformation sensing unit may correspond to a corner of the substrate and another corner that is opposite to the corner. The deformation sensing unit may include a piezoelectric element.

The flexible display apparatus may further include an amplifier between the deformation sensing unit and the control unit, the amplifier amplifying information sensed by the deformation sensing unit.

The flexible display apparatus may further include an analog-to-digital (A/D) converter that is disposed between the deformation sensing unit and the control unit, the A/D converter converting information sensed by the deformation sensing unit into digital information.

The control unit and the resolution adjusting unit may be integrally formed.

The flexible display apparatus may further include a memory that stores information related to resolution adjustment of the resolution adjusting unit, the memory being connected to the control unit or the resolution adjusting unit.

The deformation sensing unit may be on a predetermined area of a surface of the substrate. The deformation sensing unit may be on an opposite surface of the substrate from a surface of the substrate on which an image is displayed.

The flexible display apparatus may further include a touch panel that is disposed to face the substrate, the touch panel being flexible.

The display area may include a first electrode, a second electrode, and an intermediate layer disposed between the first electrode and the second electrode, the intermediate layer including an organic emissive layer.

The display area may further include a thin film transistor that is electrically connected to the first electrode and includes an active layer, a gate electrode, a source electrode, and a drain electrode.

The display area may further include a thin film transistor that is electrically connected to the first electrode and includes an active layer, a gate electrode, a source electrode, and a drain electrode. The first electrode may be on the same layer as the gate electrode.

The display area may include a liquid crystal layer.

BRIEF DESCRIPTION OF THE DRAWINGS

The above and other features will become more apparent by describing in detail exemplary embodiments thereof with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

Expressions such as "at least one of," when preceding a list of elements, modify the entire list of elements and do not modify the individual elements of the list.

Figure 1:
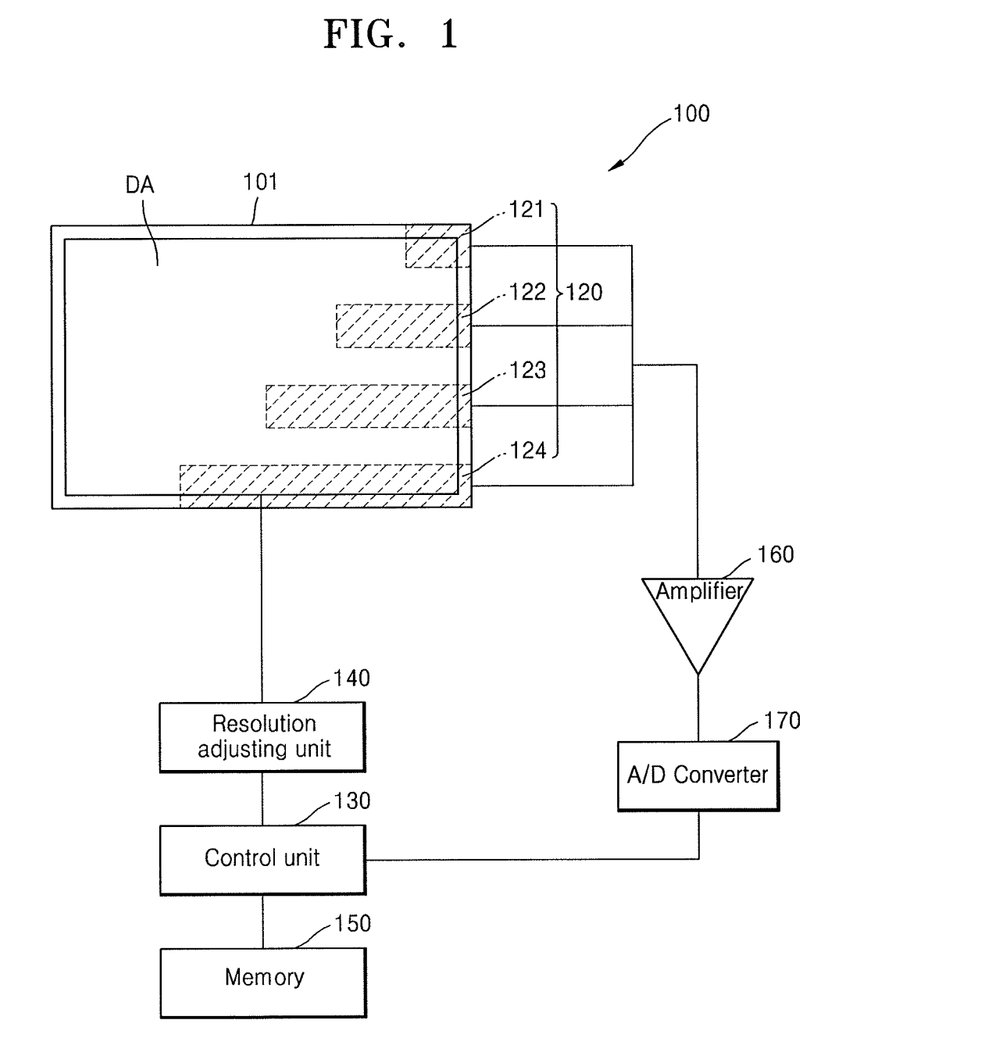
FIG. 1 is a schematic view of a flexible display apparatus according to an embodiment.

FIG. 1 is a schematic view of a flexible display apparatus 100 according to an embodiment.

Referring to FIG. 1, the flexible display apparatus 100 includes a substrate 101 including a display area DA, a deformation sensing unit 120, a control unit 130, and a resolution adjusting unit 140.

The substrate 101 is formed of a flexible material. For example, the substrate 101 may be formed of a plastic material. The plastic material for forming the substrate 101 may be at least one of various organic materials.

The substrate 101 is formed of a flexible material so as to be bent or folded according to the intention of a user. For example, the user may fold the substrate 101 along a central line thereof to reduce a size of the substrate 101 by half. Also, the substrate 101 may be folded once more to be reduced to a one-quarter size.

The display area DA of the substrate 101 is where an image is formed. A size of the display area DA is varied according to a size of the substrate 101. That is, as described above, when the size of the substrate 101 is reduced by folding the same, the size of the display area DA is also reduced accordingly. This will be described in detail below.

The deformation sensing unit 120 is formed to overlap with the display area DA. Also, the deformation sensing unit 120 may preferably be formed on the opposite surface to a surface of the display area DA of the substrate 101 where an image is formed. In detail, the deformation sensing unit 120 may be formed on a rear surface of the substrate 101. That is, a front surface of the substrate 101 is illustrated in FIG. 1, and the deformation sensing unit 120 is not actually seen in this view, and thus, is denoted by dotted lines.

In other implementations, the deformation sensing unit 120 may be provided in various forms so as to be in an overlapping relationship with the display area DA in a predetermined area on the surface of the substrate 101 in order not to reduce the features of images formed on the flexible display apparatus 100. For example, the deformation sensing unit 120 may be formed on an In-Cell structure, that is, on any one of insulating layers and conductive layers formed on the display area DA.

The deformation sensing unit 120 includes a plurality of sensing members, for example, first through fourth sensing members 121, 122, 123, and 124.

The first through fourth sensing members 121, 122, 123, and 124 may preferably be spaced apart from one another and may have different lengths.

The first through fourth sensing members 121, 122, 123, and 124 may have respective lengths corresponding to a horizontal direction of the substrate 101 and may be spaced apart from one another along a vertical direction of the substrate 101. Herein, the flexible display may be considered as being a plane. In this context, the term "horizontal" refers to a direction parallel to the longer side of the flexible display and the term "vertical" refers to a direction parallel to the shorter side of the flexible display. Terms such as "upper" and "below" with regard to the flexible display are to be understood with reference to the vertical direction. The first sensing member 121 is disposed on the upper portion of the substrate 101, and the second sensing member 122 having a longer length than the first sensing member 121 is disposed below the first sensing member 121, and the third sensing member 123 having a longer length than the second sensing member 122 is disposed below the second sensing member 122, and the fourth sensing member 124 having a longer length than the third sensing member 123 is disposed below the third sensing member 123. Also, the first through fourth sensing members 121, 122, 123, and 124 may preferably be formed to extend up to a right side edge of the substrate 101.

The deformation sensing unit 120 senses bending or folding of the substrate 101. The deformation sensing unit 120 may be in the form of a piezoelectric element to sense bending or folding of the substrate 101. Also, each of the first through fourth sensing members 121, 122, 123, and 124 of the deformation sensing unit 120 may sense bending or folding of each area of the substrate 101 to sense a variation in the size of the substrate 101. This will be described in detail below.

The control unit 130 obtains information from the deformation sensing unit 120. The control unit 130 obtains information about deformation of the substrate 101 obtained by each of the first through fourth sensing members 121, 122, 123, and 124 of the deformation sensing unit 120.

To allow the control unit 130 to obtain information more easily, an amplifier 160 may be disposed between the deformation sensing unit 120 and the control unit 130. The amplifier 160 may amplify information about deformation of the substrate 101 sensed by the deformation sensing unit 120 so that the control unit 130 may obtain and sense the information obtained by the deformation sensing unit 120 more effectively.

An analog-to-digital (A/D) converter 170 may be included between the amplifier 160 and the control unit 130 to convert information obtained by the deformation sensing unit 120 into a digital signal and transmit the digital signal to the control unit 130. Accordingly, the control unit 130 may sense information obtained by the deformation sensing unit 120 more precisely.

The control unit 130 senses deformation or folding of the substrate 101 by information transmitted from the deformation sensing unit 120. As a result, the control unit 130 senses a variation in size of the substrate 101 (which will be described in detail below). Also, the control unit 130 determines a size of the display area DA corresponding to the varied size of the substrate 101.

The resolution adjusting unit 140 is connected to the control unit 130 to determine a size of an image that is appropriate for a size of the display area DA corresponding to the varied size of the substrate 101, and determines an image resolution that is appropriate for a size of the image to adjust the image resolution to thereby provide an optimum resolution to the user. Also, according to another embodiment, the control unit 130 may determine an optimum resolution, and the resolution adjusting unit 140 may receive information about the optimum resolution and adjust a resolution according to the received information.

While the resolution adjusting unit 140 and the control unit 130 are shown as being separated from each other in FIG. 1, in other implementations, the resolution adjusting unit 140 may be integrated with the control unit 130. In detail, the resolution adjusting unit 140 may be included in the control unit 130.

When adjusting a resolution, the control unit 130 may obtain information related to an image from a memory 150 to thereby efficiently perform a resolution adjusting operation of the resolution adjusting unit 140. The memory 150 may be directly connected to the resolution adjusting unit 140, or may be included in the control unit 130.

Figure 2A:
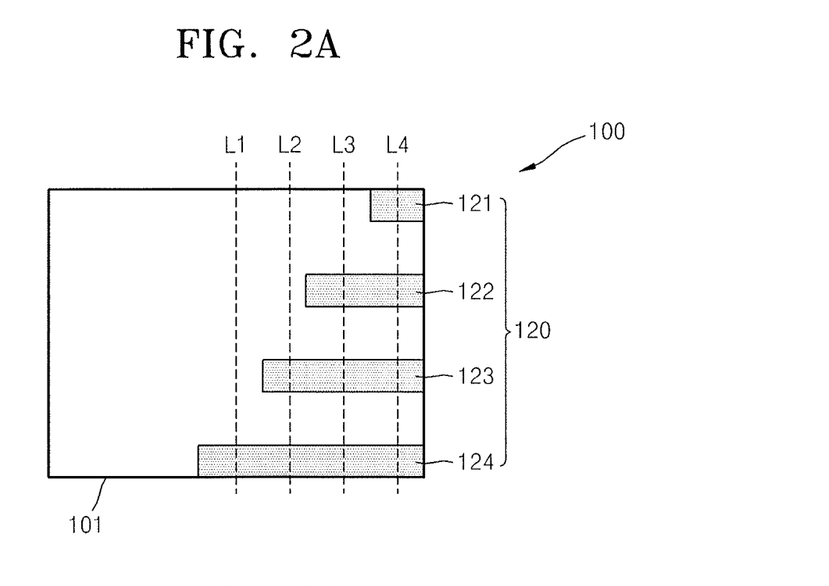
FIGS. 2A through 2C are schematic views illustrating an operation of the flexible display apparatus of FIG. 1 according to an embodiment.
Figure 2B:
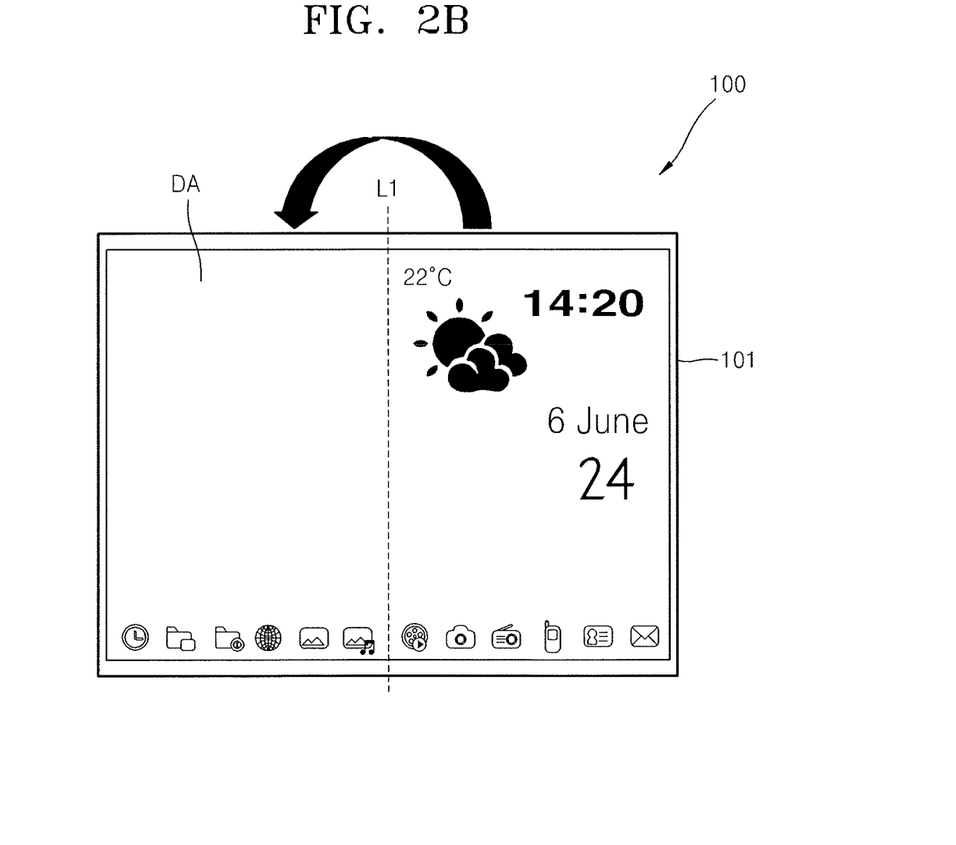
Figure 2C:
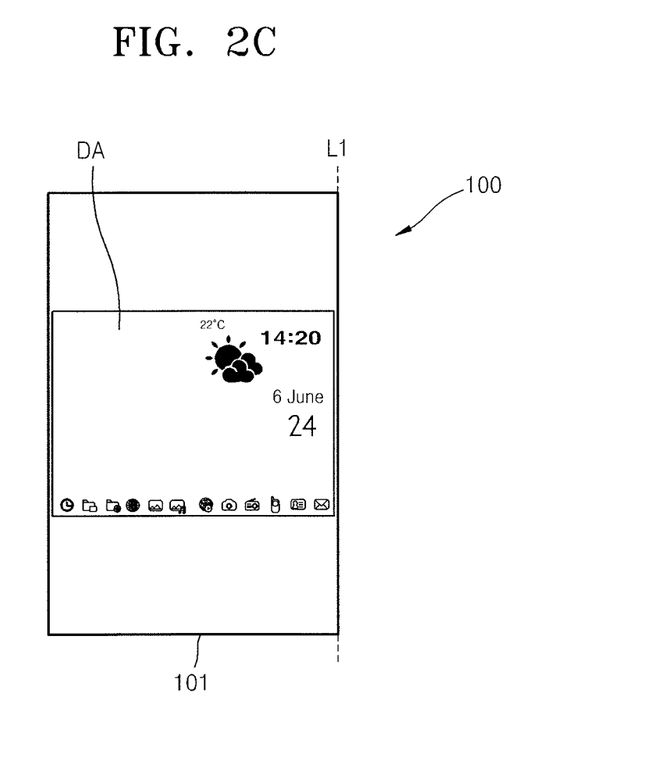

FIGS. 2A through 2C are schematic views illustrating an operation of the flexible display apparatus of FIG. 1 according to an embodiment.

Referring to FIG. 2A, the deformation sensing unit 120 formed on the rear surface of the substrate 101 is illustrated.

Dotted lines L1, L2, L3, and L4 across upper and lower edges of the substrate 101 are virtual lines. In detail, the dotted lines L1, L2, L3, and L4 may be reference lines for the user when folding the substrate 101. That is, positions and intervals of the dotted lines L1, L2, L3, and L4 may be set variously. Also, while four dotted lines are illustrated in FIG. 2A, more than four or less than four dotted lines may be present.

FIG. 2B is a view of a front surface of the substrate 101, showing an exemplary image displayed on the display area DA. The display area DA illustrated in FIG. 2B has an appropriate size corresponding to the entire surface area of the substrate 101 before being folded, and an image corresponding to this size is displayed on the display area DA.

By folding the substrate 101 along the dotted line L1 as denoted by an arrow in FIG. 2B, the substantial size of the substrate 101 is reduced by half as illustrated in FIG. 2C. Here, a size of the display area DA is also reduced in according with the size of the substrate 101. Meanwhile, considering the characteristics of an image recognized by the user, the display area DA may preferably be reduced without changing an aspect ratio of the display area DA.

In detail, when the substrate 101 is folded with respect to the dotted line L1 as illustrated in FIG. 2B, the fourth sensing member 124 of the deformation sensing unit 120 formed on the rear surface of the substrate 101 senses deformation of the substrate 101. Here, the first sensing member 121, the second sensing member 122, and the third sensing member 123 do not sense deformation of the substrate 101.

Information about deformation of the substrate 101 sensed by the deformation sensing unit 120 is transmitted to the control unit 130. As described above, the amplifier 160 and the A/D converter 170 may be selectively included so that the control unit 130 may efficiently obtain information from the deformation sensing unit 120.

The control unit 130 detects a substantially reduced size of the substrate 101 that is reduced by folding, by using the information received from the deformation sensing unit 120. The control unit 130 obtains information about deformation of the substrate 101 that is sensed by only the fourth sensing member 124 from among the first through fourth sensing members 121, 122, 123, and 124, and determines from the information that the reference line along which the substrate 101 is folded is approximately a center of the substrate 101, that is, a position similar to the dotted line L1. As a result, the control unit 130 determines that the size of the substrate 101 is reduced approximately by half. The control unit 130 transmits information about the size of the display area DA corresponding to the reduced size of the substrate 101 and a resolution of the display area DA, to the resolution adjusting unit 140.

The resolution adjusting unit 140 adjusts the display area DA to an appropriate size by using the information received from the control unit 130, and determines an appropriate resolution for the size of the display area DA to thereby adjust a resolution of the display area DA. Accordingly, the user may view an image having an appropriate size and an appropriate resolution corresponding to the deformation of the size of the substrate 101 even when the size of the substrate 101 is varied.

Here, deformation of the substrate 101, that is, a folding degree thereof, may be sensed by variously setting conditions such as width, length, arrangement, and interval of the deformation sensing unit 120.

According to the current embodiment, even though the substantial size of the substrate 101 is varied when the user folds the substrate 101, a uniform image quality may be maintained by adjusting the size (of the display area DA) corresponding to the varied size of the substrate 101 and the resolution (of the display area DA), based on the deformation sensing unit 120 disposed on the rear surface of the substrate 101. In particular, the deformation adjusting unit 120 includes a plurality of sensing members, such as the first through fourth sensing members 121, 122, 123, and 124, to easily sense a location where the substrate 101 is folded, and thus the size of the substrate 101 may be easily detected.

FIGS. 3A through 3D are schematic views illustrating an operation of the flexible display apparatus 200 according to another embodiment.

Figure 3A:
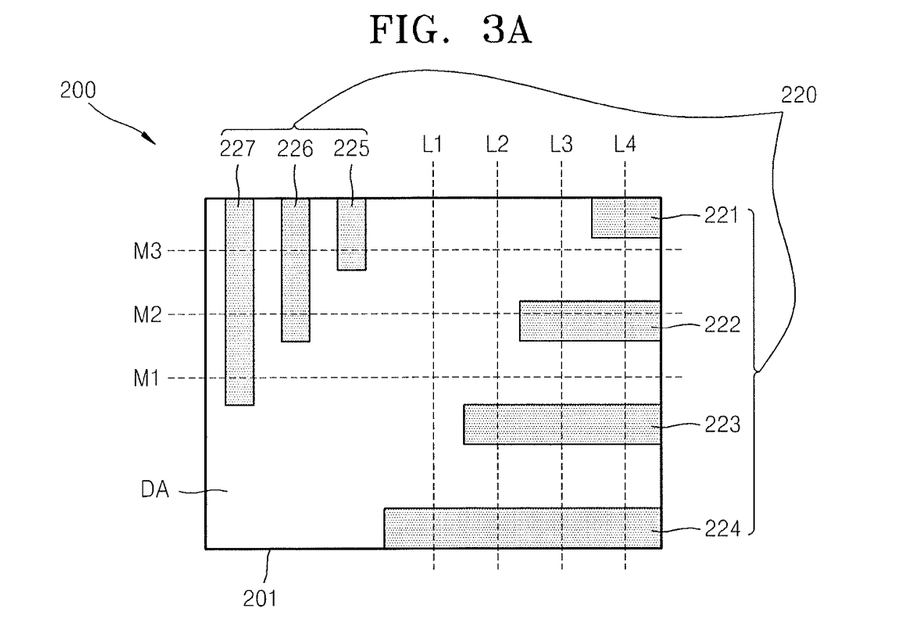
FIGS. 3A through 3D are schematic views illustrating an operation of a flexible display apparatus according to another embodiment.

The flexible display apparatus 200 includes a substrate 201 having a display area DA, a deformation sensing unit 220, and a control unit (not shown) and a resolution adjusting unit (not shown).

The deformation sensing unit 220 includes a plurality of sensing members, that is, first through seventh sensing members 221, 222, 223, 224, 225, 226, and 227.

First, FIG. 3A illustrates the deformation sensing unit 220 fowled on a rear surface of the substrate 201. The first sensing member 221, the second sensing member 222, the third sensing member 223, and the fourth sensing member 224 have respective lengths corresponding to a horizontal direction of the substrate 201 and are sequentially spaced apart from one another along a vertical direction of the substrate 201. The first sensing member 221 is disposed on a right upper portion of the substrate 201, and the second sensing member 222 having a longer length than the first sensing member 221 is disposed below the first sensing member 221, and the third sensing member 223 having a longer length than the second sensing member 222 is disposed below the second sensing member 222, and the fourth sensing member 224 having a longer length than the third sensing member 223 is disposed below the third sensing member 223. Also, the first through fourth sensing members 221, 222, 223, and 224 may preferably extend to a right edge of the substrate 201.

Also, the fifth through seventh sensing members 225 through 227 have respective lengths corresponding to a vertical direction of the substrate 201 and are sequentially spaced apart from one another along a horizontal direction of the substrate 201. The fifth sensing member 225 is spaced apart from the first through fourth sensing members 221, 222, 223, and 224, and the sixth sensing member 226 having a longer length than the fifth sensing member 225 is disposed on the left side of the fifth sensing member 225, and the seventh sensing member 227 having a longer length than the sixth sensing member 226 is disposed on the left side of the sixth sensing member 226. Also, the fifth through seventh sensing members 225 through 227 may preferably extend up to an upper edge of the substrate 201.

Dotted lines L1, L2, L3, and L4 across upper and lower edges of the substrate 201 and dotted lines M1, M2, and M3 across left and right edges of the substrate 201 are virtual lines. In detail, the dotted lines L1, L2, L3, L4, M1, M2, and M3 may be reference lines for the user when folding the substrate 201.

Figure 3B:
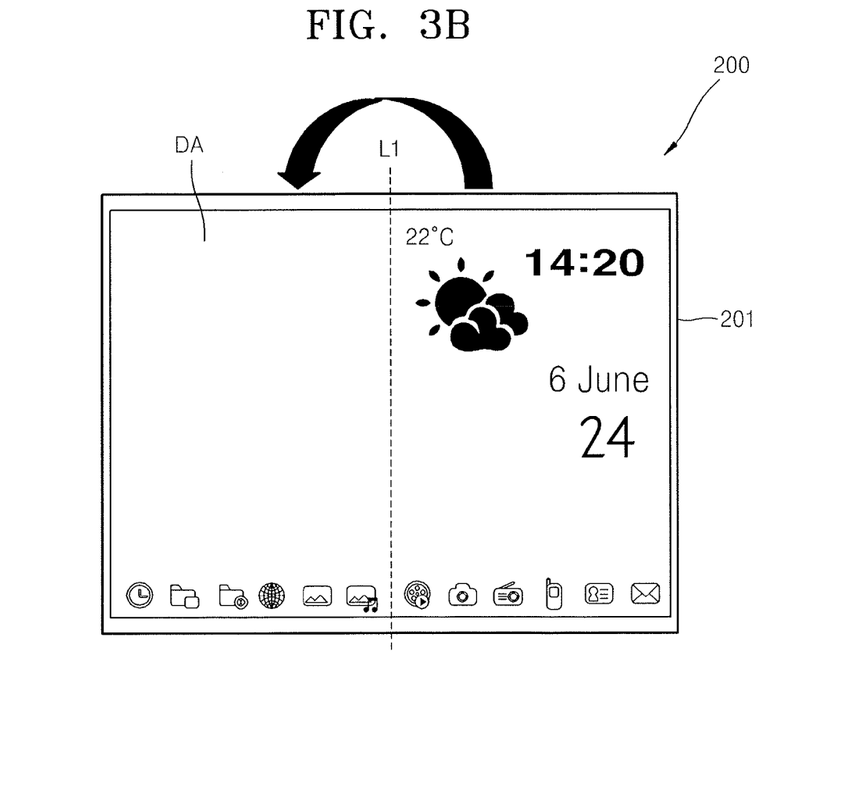

FIG. 3B illustrates a front surface of the substrate 201, and an exemplary image is displayed on the display area DA. The display area DA illustrated in FIG. 3B has a size corresponding to the entire surface area of the substrate 201 before being folded, and an image corresponding to the size of the display area DA is displayed.

Figure 3C:
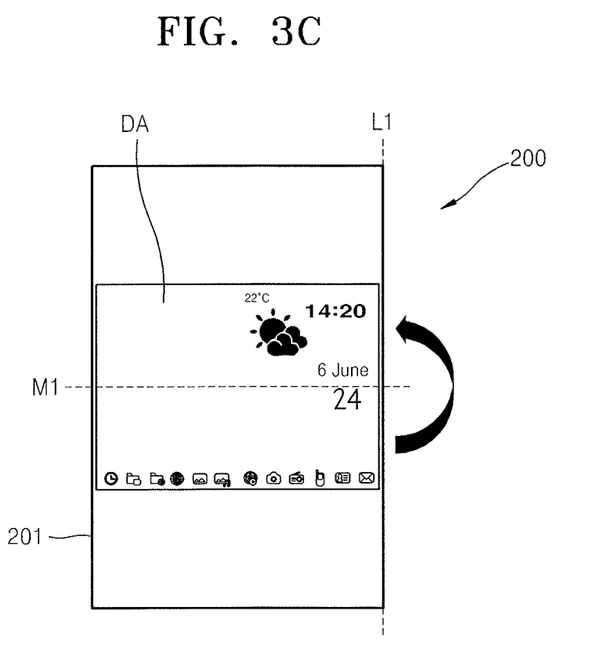

When folding the substrate 201 along the dotted line L1 illustrated in FIG. 3B, the substantial size of the substrate 201 is reduced by half as illustrated in FIG. 3C. The size of the display area DA is also reduced in accordance with the substrate 201. Meanwhile, considering characteristics of an image recognized by the user, the size of the display area DA may preferably be reduced without changing an aspect ratio of the display area DA.

In detail, when folding the substrate 201 along the dotted line L1 as illustrated in FIG. 3B, the fourth sensing member 224 of the deformation sensing unit 220 formed on the rear surface of the substrate 201 senses deformation of the substrate 201. Here, the first sensing member 221, the second sensing member 222, and the third sensing member 223 do not sense deformation of the substrate 201. Also, the fifth sensing member 225, the sixth sensing member 226, and the seventh sensing member 227 do not sense deformation of the substrate 201.

The information about deformation of the substrate 201 sensed by the deformation sensing unit 220 is transmitted to the control unit (not shown). The control unit (not shown) detects a substantially reduced size of the substrate 201 that is reduced by folding the substrate 201 based on the information received from the deformation sensing unit 220. The control unit (not shown) transmits information about the size of the display area DA corresponding to the size of the substrate 201 and a resolution of the display area DA.

The resolution adjusting unit (not shown) adjusts the display area DA to an appropriate size by using the information received from the control unit (not shown) and determines an appropriate resolution for the size of the display area DA to adjust the resolution of the display area DA. Accordingly, even when the size of the substrate 201 is deformed, the user may recognize an image having an appropriate size and an appropriate resolution corresponding to the deformation of the substrate 201.

Here, deformation of the substrate 201, that is, a folding degree thereof may be precisely recognized by variously setting conditions such as width, length, arrangement position, and interval of the deformation sensing unit 220.

Figure 3D:
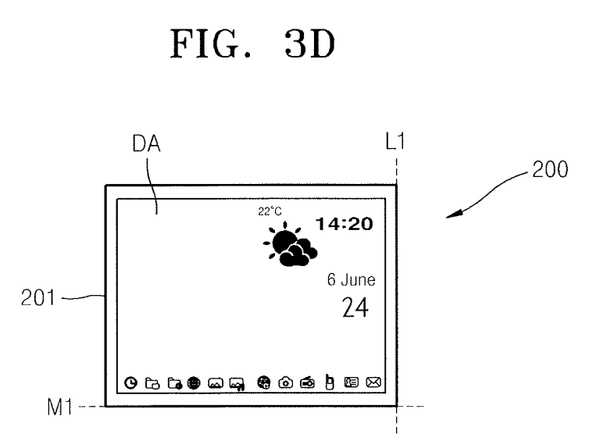

In addition, when folding the substrate 201 along the dotted line M1 along an arrow direction illustrated in FIG. 3C, the substantial size of the substrate 201 is further reduced as illustrated in FIG. 3D. Here, the size of the display area DA may not be reduced in accordance with the size of the substrate 201. That is, in consideration of characteristics of an image recognized by the user, an aspect ratio of the display area DA is not varied, and thus, the size of the display area DA may be the same when compared with FIG. 3C.

In detail, when folding the substrate 201 along the dotted line M1 as illustrated in FIG. 3C, the seventh sensing member 227 of the deformation sensing unit 220 formed on the rear surface of the substrate 201 senses deformation of the substrate 201. Here, the fifth sensing member 225 and the sixth sensing member 226 do not sense deformation of the substrate 201. Also, the first sensing member 221, the second sensing member 222, the third sensing member 223, and the fourth sensing member 224 do not sense deformation of the substrate 201.

The information about deformation of the substrate 201 sensed by the deformation sensing unit 220 is transmitted to the control unit 230. Transmission of information to the resolution adjusting unit (not shown) via the control unit 230 and adjustment of the resolution by the resolution adjusting unit (not shown) are similar as described above, and thus, a description thereof will not be repeated.

Compared to the above-described embodiments, according to the flexible display apparatus 200 of the current embodiment, the number of sensing members of the deformation sensing unit 220 may be increased and arrangement positions thereof may be varied so that deformation of the substrate 201 of the flexible display apparatus 200 may be precisely sensed, thereby adjusting the size and resolution of the display area DA more precisely.

Figure 4:
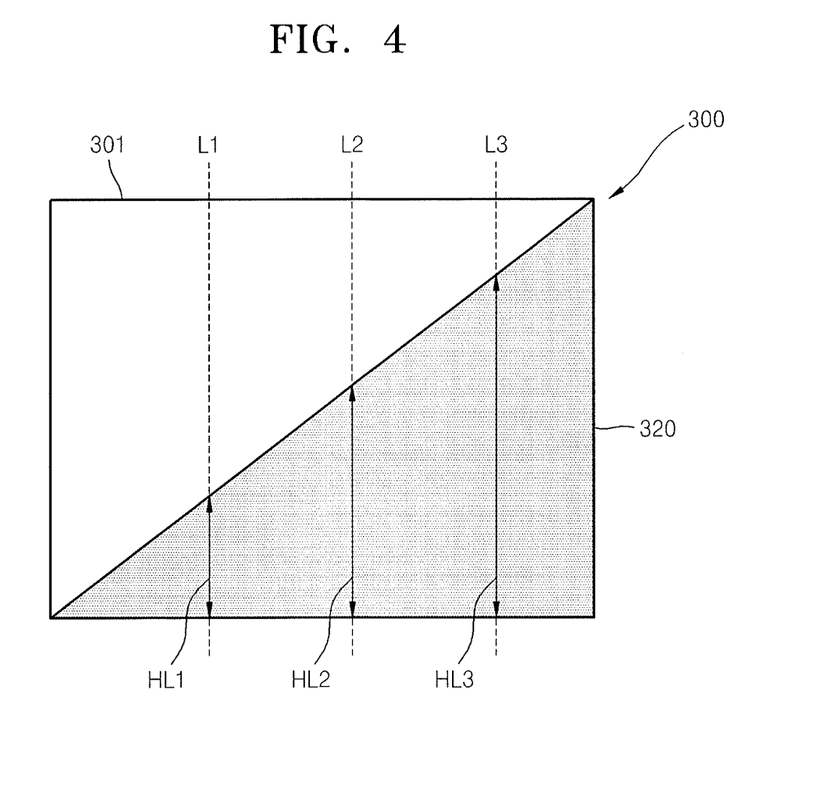
FIG. 4 is a schematic view illustrating an operation of a flexible display apparatus according to another embodiment.

FIG. 4 is a schematic view illustrating an operation of a flexible display apparatus 300 according to another embodiment.

The flexible display apparatus 300 includes a substrate 301 having a display area (not shown), a deformation sensing unit 320, and a control unit (not shown) and a resolution adjusting unit (not shown).

Unlike the previous embodiments, the deformation sensing unit 320 does not include a plurality of sensing members but has a single form. The deformation sensing unit 320 is formed to correspond to an edge of the substrate 301 and to another edge thereof, and to have various widths according to areas. That is, the deformation sensing unit 320 is formed such that a width of the deformation sensing unit 329 increases from the left to the right of the substrate 301. For example, the deformation sensing unit 320 may have a similar shape to a right-angle triangle.

The deformation sensing unit 320 may be formed to correspond to a right edge and a lower edge of the substrate 301 and to an upper right corner and a lower left corner.

Dotted lines L1, L2, and L3 across an upper edge and a lower edge of the substrate 301 are virtual lines. In detail, the dotted lines L1, L2, and L3 may be reference lines for the user to fold the substrate 301.

When folding the substrate 301 along the dotted line L1 illustrated in FIG. 4, deformation is sensed along a predetermined width HL1 of the deformation sensing unit 320. Also, when folding the substrate 301 along the dotted line L2, deformation is sensed along a predetermined width HL2 of the deformation sensing unit 320. Also, when folding the substrate 301 along the dotted line L3, deformation is sensed along a predetermined width HL3 of the deformation sensing unit 320.

That is, according to the current embodiment, even when the deformation sensing unit 320 does not include a plurality of sensing members, widths along which the deformation sensing unit 320 is folded may vary according to the dotted lines L1, L2, and L3, along which the user folds the substrate 301, and thus the position at which the substrate 301 is folded and the size of the substrate 301 that is substantially varied accordingly may be easily detected.

For example, when the user folds the substrate 301, a size of the value that the deformation sensing unit 320 senses is larger when folding the substrate 301 along the dotted line L3 in comparison with when folding the substrate 301 along the dotted line L1. That is, a folding position of the substrate 301 may be detected via a size of the value based on a degree of deformation of the substrate 301 sensed by the deformation sensing unit 320.

In detail, the control unit (not shown) detects the folding position of the substrate 301 via a size of the value based on a degree of deformation of the substrate 301 sensed by the deformation sensing unit 320, and the substantially varied size of the substrate 301 after the substrate 301 is folded, based on the folding position.

Transmission of information to the resolution adjusting unit (not shown) via the control unit (not shown) and resolution adjustment by the resolution adjusting unit (not shown) are similar to those described above.

Figure 5:
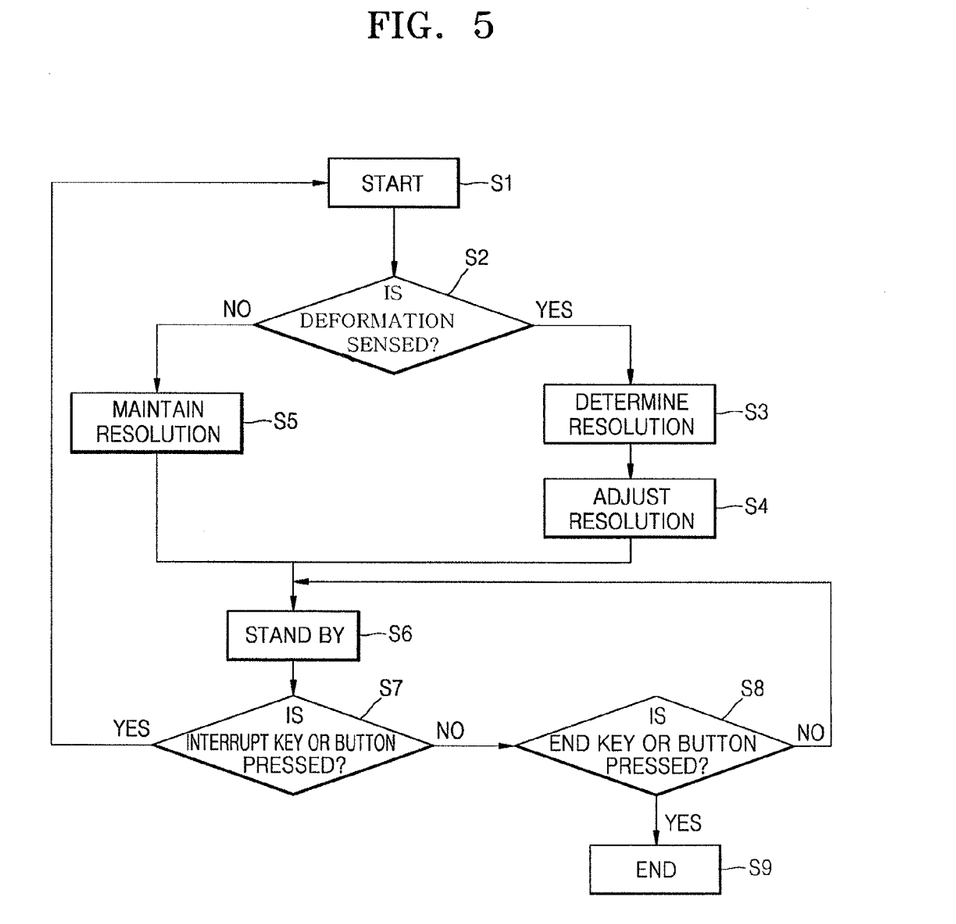
FIG. 5 is a flowchart illustrating an operation of a flexible display apparatus according to an embodiment.

FIG. 5 is a flowchart illustrating an operation of a flexible display apparatus according to an embodiment.

In detail, FIG. 5 is a flowchart of the operation of the flexible display apparatus 100 of FIG. 1. The operation of FIG. 5 may also be applied to the flexible display apparatuses 200 and 300 described above.

Referring to FIG. 5, the operation proceeds from a starting operation S1 to a deformation sensing operation S2. When the deformation sensing unit 120 senses deformation of the substrate 101 in the deformation sensing operation S2, a resolution determining operation S3 and a resolution adjusting operation S4 are sequentially performed. The resolution determining operation S3 may be performed by using information that the control unit 130 receives from the deformation sensing unit 120. Also, in the resolution determining operation S3, the resolution adjusting unit 140 may determine a resolution based on information received from the control unit 130.

If the deformation sensing unit 120 does not sense deformation of the substrate 101 in the deformation sensing operation S2, that is, if the size of the substrate 101 is not substantially varied, a resolution maintaining operation S5 is performed.

Then, if there is any operation or manipulation, the operation stays in a standby mode S6, and when an interrupt key or button is pressed in an interrupting operation S7, the operation returns to the starting operation S1 and the above-described operations are performed. If an interrupt key or button is not pressed in the interrupting operation S7, the operation proceeds to a sensing ending operation S8.

If an end button or key is pressed in the sensing ending operation S8, the ending operation S9 is performed, and if an end button is not pressed, the operation returns to the standby mode S6 to perform the above-described operations.

The operation of the flexible display apparatus 100 described with reference to FIG. 5 is exemplary. That is, the flexible display apparatus 100 may also operate in various manners.

Figure 6:
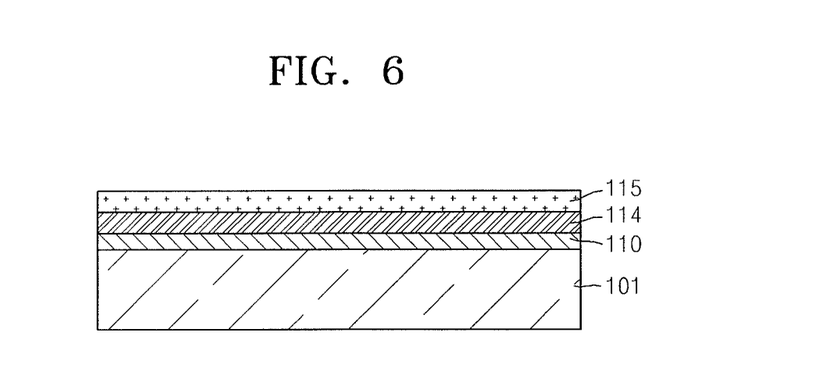
FIGS. 6 through 9 are schematic cross-sectional views illustrating a display area of a flexible display apparatus according to embodiments.

FIG. 6 is a schematic cross-sectional view of the display area DA of the flexible display apparatus 100 of FIG. 1 according to an embodiment. The display area DA illustrated in FIG. 6 may also be applied to the flexible display apparatuses 200 and 300 described above. In the cross-sectional views of FIGS. 6-10, terms such as "upper" and "lower" are to be understood in the context of the orientation shown in these figures.

Referring to FIG. 6, the display area DA includes a substrate 101, a first electrode 110, an intermediate layer 114, and a second electrode 115.

The elements described above will be described in detail below.

The substrate 101 is formed of a flexible material. For example, the substrate 101 may be formed of a transparent plastic material.

The first electrode 110 is formed on the substrate 101. The first electrode 110 may include ITO, IZO, ZnO, or $In_2O_3$. Also, according to the purpose and design conditions, the first electrode 110 may further include a reflection layer formed of Ag, Mg, Al, Pt, Pd, Au, Ni, Nd, Ir, Cr, Li, Yb or Ca.

Although not shown in the drawings, a buffer layer (not shown) may be further included between the substrate 101 and the first electrode 110. The buffer layer (not shown) prevents penetration of impurities through the substrate 101 and provides a planar surface on the substrate 101, and may be formed of various materials capable of performing these functions. For example, the buffer layer (not shown) may include an inorganic material such as silicon oxide, silicon nitride, silicon oxynitride, aluminum oxide, aluminum nitride, titanium oxide, or titanium nitride, an organic material such as polyimide, polyester or acryl, or a stack structure including a plurality of the above materials.

The intermediate layer 114 is formed on the first electrode 110. The intermediate layer 114 includes an organic emissive layer to generate visible rays. The intermediate layer 114 may be formed of a low-molecular or polymer organic layer. When the intermediate layer 114 is formed of a low-molecular organic layer, the intermediate layer 114 may include a hole injection layer (HIL), a hole transport layer (HTL), an organic emissive layer, an electron transport layer (ETL), and an electron injection layer (EIL), or the like.

The HIL may be formed of a phthalocyanine compound such as copper phthalocyanine or Starburst type amine such as TCTA, m-MTDATA, or m-MTDAPB.

The HTL may be formed of N,N'-bis(3-methylphenyl)-N,N'-diphenyl-[1,1-biphenyl]-4,4'-diamine (TPD), N,N'-di(naphthalene-1-yl)-N,N'-diphenylbenzidine(α-NPD) or the like.

The EIL may be formed using, for example, LiF, NaCl, CsF, $Li_2O$, BaO, or Liq. For example, the ETL may be formed using Alq3.

The organic emissive layer may include a host material and a dopant material. Examples of the host material of the organic emissive layer include tris(8-hydroxy-quinolinato)aluminum (Alq3), 9,10-di(naphth-2-yl)anthracene (AND), 3-tert-butyl-9,10-di(naphth-2-yl)anthracene (TBADN), 4,4'-bis(2,2-diphenyl-ethene-1-yl)-4,4'-dimethylphenyl (DPVBi), 4,4'-bisbis(2,2-diphenyl-ethene-1-yl)-4,4'-dimethylphenyl (p-DMDPVBi), tert(9,9-diarylfluorene)s (TDAF), 2-(9,9'-spirobifluorene-2-yl)-9,9'-spirobifluorene (BSDF), 2,7-bis(9,9'-spirobifluorene-2-yl)-9,9'-spirobifluorene (TSDF), bis(9,9-diarylfluorene)s (BDAF), 4,4'-bis(2,2-diphenyl-ethene-1-yl)-4,4'-di-(tert-butyl)phenyl (p-TDPVBi), 1,3-bis(carbazole-9-yl)benzene (mCP), 1,3,5-tris(carbazole-9-yl)benzene (tCP), 4,4',4"-tris(carbazole-9-yl)triphenylamine (TcTa), 4,4'-bis(carbazole-9-yl)biphenyl (CBP), 4,4'-bisbis(9-carbazolyl)-2,2'-dimethyl-biphenyl (CBDP), 4,4'-bis(carbazole-9-yl)-9,9-dimethyl-fluorene (DMFL-CBP), 4,4'-bis(carbazole-9-yl)-9,9-bisbis(9-phenyl-9H-carbazole)fluorene (FL-4CBP), 4,4'-bis(carbazole-9-yl)-

9,9-di-tolyl-fluorene (DPFL-CBP), 9,9-bis(9-phenyl-9H-carbazole)fluorene (FL-2CBP).

Examples of the dopant material of the organic emissive layer are 4,4'-bis[4-(di-p-tolylamino)styryl]biphenyl (DPAVBi), 9,10-di(naphth-2-yl)anthracene (ADN), and 3-tert-butyl-9,10-di(naphth-2-yl)anthracene (TBADN).

The second electrode 115 is formed on the intermediate layer 114. The second electrode 115 may be formed of metal such as Ag, Mg, Al, Pt, Pd, Au, Ni, Nd, Ir, Cr, Li, or Ca.

An encapsulation member may be disposed on the second electrode 115. The encapsulation member is formed to protect the intermediate layer 114 and other layers from water or oxygen from the outside, and may be formed of plastic or may have a structure in which a plurality of layers such as an organic material and an inorganic material are stacked.

Figure 7:
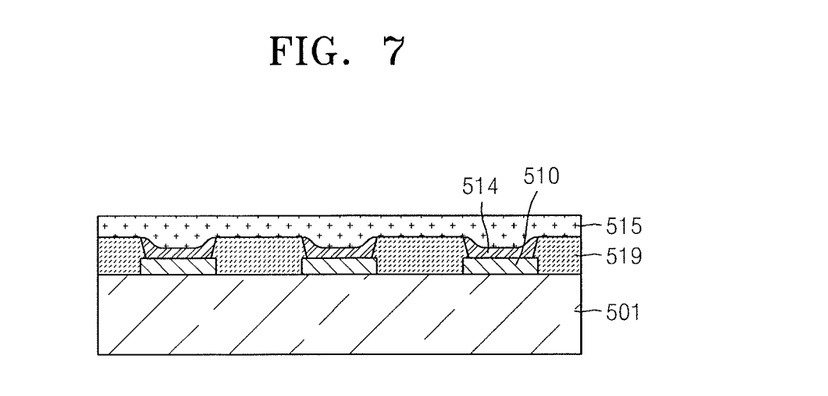

FIG. 7 is a schematic cross-sectional view of the display area DA of the flexible display apparatus 100 of FIG. 1 according to another embodiment. The display area DA illustrated in FIG. 7 may also be applied to the flexible display apparatuses 200 and 300 described above.

Referring to FIG. 7, the display area DA includes a substrate 501, a first electrode 510, a pixel define layer 519, an intermediate layer 514, and a second electrode 515. The elements described above will be described in detail below. For convenience of description, description will focus on differences from the previous embodiments.

The first electrode 510 is formed on the substrate 501.

The pixel define layer 519 is formed on the first electrode 510 using an insulation material. The pixel define layer 519 may be formed to have an opening exposing an upper surface of the first electrode 510.

The intermediate layer 514 is formed on the exposed upper surface of the first electrode 510. The intermediate layer 514 includes an organic emissive layer to generate visible rays.

The second electrode 515 is formed on the intermediate layer 514.

An encapsulation member (not shown) may be disposed on the second electrode 515.

Figure 8:
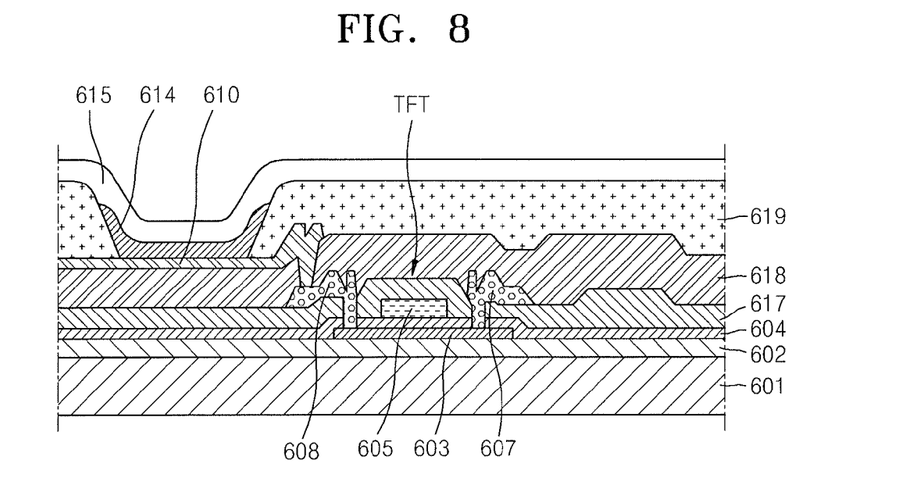

FIG. 8 is a schematic cross-sectional view of the display area DA of the flexible display apparatus 100 of FIG. 1 according to another embodiment. The display area DA illustrated in FIG. 8 may also be applied to the flexible display apparatuses 200 and 300 described above.

Referring to FIG. 8, the display area DA includes a thin film transistor (TFT) formed on a substrate 601. The TFT includes an active layer 603, a gate electrode 605, a source electrode 607, and a drain electrode 608. The elements described above will be described in detail below. For convenience of description, description will focus on differences from the previous embodiments.

A buffer layer 602 is formed on the substrate 601. The buffer layer 602 may be omitted.

An active layer 603 having a predetermined pattern is formed on the buffer layer 602. The active layer 603 may be formed of an inorganic semiconductor or an organic semiconductor such as amorphous silicon or polysilicon, and includes a source region, a drain region, and a channel region. The source region and the drain region of the active layer 603 may be formed using amorphous silicon or polysilicon and then by doping with impurities of Group III or Group V.

A gate insulating layer 604 is formed on the active layer 603, and a gate electrode 605 is formed on a predetermined area on the gate insulating layer 604. The gate insulating layer 604 insulates the active layer 603 and the gate electrode 605 from each other, and may be formed of an organic material or an inorganic material such as $SiN_x$, or $SiO_2$.

The gate electrode 605 may be formed of various suitable materials in consideration of adhering properties, planarization, electrical resistance, and processability with respect to adjacent layers. The gate electrode 605 may include Au, Ag, Cu, Ni, Pt, Pd, Al, Mo, or the like, or an alloy such as an Al:Nd alloy or a Mo:W alloy, as examples.

An interlayer insulating layer 617 is formed on the gate electrode 605. The interlayer insulating layer 617 and the gate insulating layer 604 are formed to expose the source region and the drain region of the active layer 603, and a source electrode 607 and a drain electrode 608 are formed so as to contact the exposed source region and the exposed drain region of the active layer 603.

The source electrode 607 and the drain electrode 608 may be formed using various conductive materials, and may have a single-layer structure or a multi-layer structure.

A passivation layer 618 is formed on the TFT. In detail, the passivation layer 618 is formed on the source electrode 607 and the drain electrode 608.

The passivation layer 618 is formed not to cover the whole drain electrode 608 but to expose a predetermined region of the drain electrode 608, and a first electrode 610 is formed to be connected to the exposed drain electrode 608.

The pixel define layer 619 is formed on the first electrode 610 using an insulating material. The pixel define layer 619 is formed to expose a predetermined region of the first electrode 610, and an intermediate layer 614 is formed to contact an exposed portion of first electrode 610. Also, a second electrode 615 is formed to be connected to the intermediate layer 614.

An encapsulation member (not shown) may be disposed on the second electrode 615.

Figure 9:
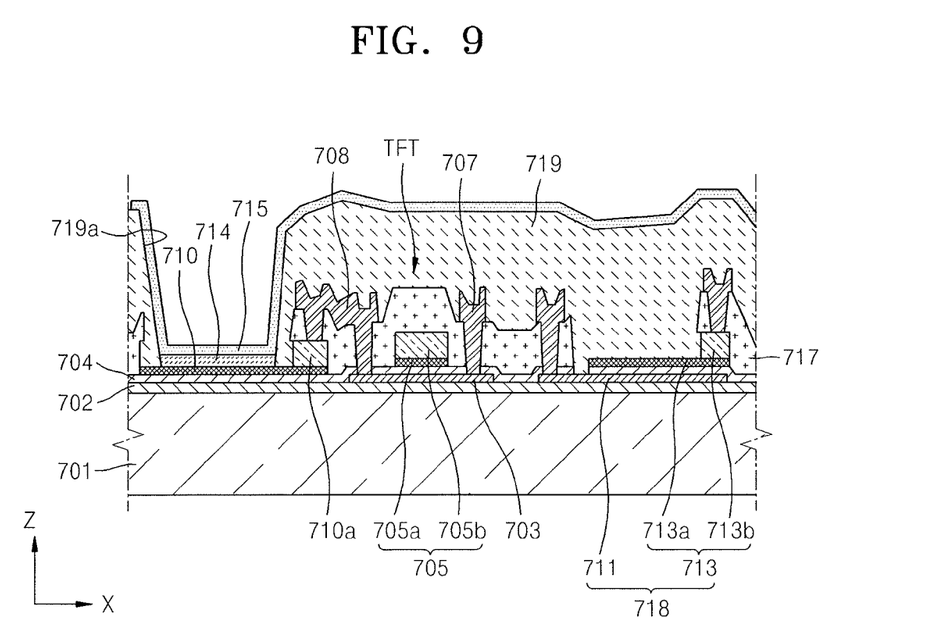

FIG. 9 is a schematic cross-sectional view of the display area DA of the flexible display apparatus 100 of FIG. 1 according to another embodiment. The display area DA illustrated in FIG. 9 may also be applied to the flexible display apparatuses 200 and 300 described above.

Referring to FIG. 9, the display area DA includes a TFT and a capacitor 718 formed on a substrate 701. The TFT includes an active layer 703, a gate electrode 705, a source electrode 707, and a drain electrode 708. The elements described above will be described in detail below. For convenience of description, description will focus on differences from the previous embodiments.

A buffer layer 702 is formed on the substrate 701. The active layer 703 having a predetermined size is formed on the buffer layer 702. Also, a first capacitor electrode 711 is formed on the buffer layer 702. The first capacitor electrode 711 may preferably be formed of the same material as the active layer 703.

A gate insulating layer 704 is formed on the buffer layer 702 to cover the active layer 703 and the first capacitor electrode 711.

The gate electrode 705, a first electrode 710, and a second capacitor electrode 713 are formed on the gate insulating layer 704.

The gate electrode 705 includes a first conductive layer 705a and a second conductive layer 705b.

The first electrode 710 may be formed of the same material as the first conductive layer 705a. A conductive portion 710a is formed on a predetermined area of the first electrode 710, and the conductive portion 710a is formed of the same material as the second conductive layer 705b.

The second capacitor electrode 713 includes a first layer 713a and a second layer 713b, and the first layer 713a is formed of the same material as the first conductive layer 705a, and the second layer 713b is formed of the same material as the second conductive layer 705b. The second layer 713b is formed on the first layer 713a and is smaller than the first layer 713a. Also, the second capacitor electrode 713 is overlapped with the first capacitor electrode 711 and is smaller than the first capacitor electrode 711.

An interlayer insulating layer 717 is formed on the first electrode 710, the gate electrode 705, and the second capacitor 713. A source electrode 707 and a drain electrode 708 are formed on the interlayer insulating layer 717. The source electrode 707 and the drain electrode 708 are formed to be connected to the active layer 703.

Also, one of the source electrode 707 and the drain electrode 708 is electrically connected to the first electrode 710. Referring to FIG. 9, the drain electrode 708 is electrically connected to the first electrode 710. In detail, the drain electrode 708 contacts the conductive portion 710a.

A pixel define layer 719 covering the source electrode 707, the drain electrode 708, and the capacitor 718 is formed on the interlayer insulating layer 717.

The pixel define layer 719 is formed to have a predetermined opening portion 719a corresponding to an upper surface of the first electrode 710, and an intermediate layer 714 is formed on a portion of the first electrode 710 that is exposed through the opening portion 719a of the pixel define layer 719.

A second electrode 715 is formed on the intermediate layer 714. Although not shown in the drawings, an encapsulation member (not shown) may be disposed on the second electrode 715. The encapsulation member is formed to protect the intermediate layer 714 or the second electrode 715 from being damaged due to external foreign bodies or external impact, and may be formed of glass or a metal thin film or may have a stack structure including organic and inorganic materials.

According to the above embodiments, an intermediate layer including an organic emissive layer, that is, an organic light emitting device is illustrated as the display area DA, but in other implementations, other configurations are possible.

Figure 10:
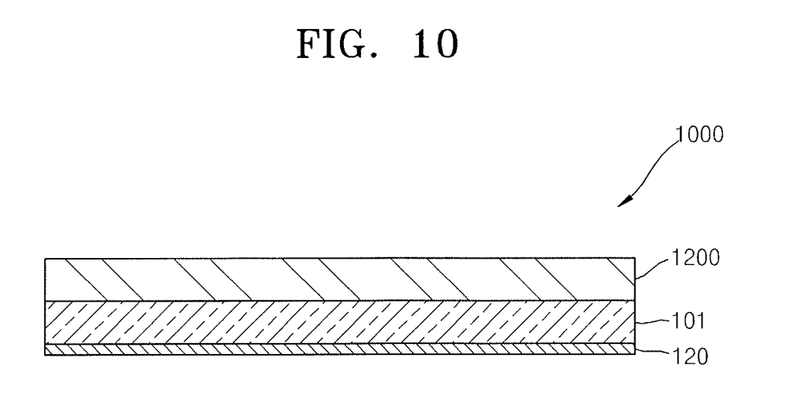
FIG. 10 is a cross-sectional view illustrating a flexible display apparatus according to another embodiment.

FIG. 10 is a cross-sectional view illustrating a flexible display apparatus 1000 according to another embodiment.

Referring to FIG. 10, the flexible display apparatus 1000 includes a substrate 101, a deformation sensing unit 120, and a touch panel 1200. That is, the flexible display apparatus 1000 further includes the touch panel 1200 on the flexible display apparatus 100 of FIG. 1.

However, although not shown in the drawings, the touch panel 1200 may also be disposed on the flexible display apparatuses 200 and 300 described above.

The touch panel 1200 according to the current embodiment is flexible, and thus may be bent or folded like the substrate 101 according to a user's intention.

Also, referring to FIG. 10, the deformation sensing unit 120 is disposed on a lower surface of the substrate 101, but in other implementations, the deformation sensing unit 120 may be disposed between the substrate 101 and the touch panel 1200 or may be disposed on the touch panel 1200.

By way of summation and review, in the case a display apparatus being bent or folded to a desired extent, a size of an area where an image is formed on a flexible display apparatus may be varied, and the image may be distorted accordingly. As a result, when a user bends or folds a flexible display apparatus, it may be difficult to maintain an initial image resolution. Accordingly, an image quality of the flexible display apparatus may be reduced, and it may be difficult to increase user convenience.

Embodiments may provide a flexible display apparatus in which image quality may be improved.

While the present invention has been particularly shown and described with reference to exemplary embodiments thereof, it will be understood by those of ordinary skill in the art that various changes in form and details may be made therein without departing from the spirit and scope as defined by the following claims.

What is claimed is:

1. A flexible display apparatus, comprising:
a substrate that is flexible and is foldable according to an intention of a user, the substrate including a display area, wherein a size of the display area is variable according to a folding of the substrate;
a deformation sensing unit that is in an overlapping relationship with the display area and that senses folding of the substrate that varies the size of the display area;
a control unit obtaining information from the deformation sensing unit, wherein the deformation sensing unit includes a plurality of sensing members that are spaced apart from one another and that have different lengths, the lengths of the plurality of sensing members gradually increasing in a predetermined direction; and
a resolution adjusting unit that is controlled by the control unit and that adjusts a resolution of an image displayed on the display area according to a varied size of the display area.

2. The flexible display apparatus of claim 1, wherein the size of the display area is varied according to a folded or unfolded state of the substrate.

3. The flexible display apparatus of claim 2, wherein, when the size of the display area is varied, the resolution adjusting unit maintains an aspect ratio of an image displayed on the display area to be constant.

4. The flexible display apparatus of claim 1, wherein the control unit detects a substantially varied size of the display area according to the folding of the substrate based on information received from the deformation sensing unit.

5. The flexible display apparatus of claim 4, wherein the control unit determines a size of the display area and a resolution corresponding to the substantially varied size of the display area in accordance with a folded or unfolded state of the substrate and transmits information about the size and the resolution of the display area to the resolution adjusting unit.

6. The flexible display apparatus of claim 4, wherein:
the control unit transmits information about the substantially varied size of the display area to the resolution adjusting unit, and
the resolution adjusting unit determines a size of the display area and a resolution corresponding to the substantially varied size of the display area so as to correspond to a folded or unfolded state of the substrate and adjusts the resolution of the display area according to the determined resolution.

7. The flexible display apparatus of claim 1, wherein the control unit determines a substantial size of the display area after the substrate is in a folded state, based on information about deformation of the substrate sensed by each of the plurality of sensing members.

8. The flexible display apparatus of claim 1, wherein the plurality of sensing members have respective lengths along a horizontal direction of the substrate, and are spaced apart from one another along a vertical direction of the substrate.

9. The flexible display apparatus of claim 1, wherein the plurality of sensing members have respective lengths along a vertical direction of the substrate, and are spaced apart from one another along a horizontal direction of the substrate.

10. The flexible display apparatus of claim 1, wherein the plurality of sensing members extend up to an edge of the substrate.

11. The flexible display apparatus of claim 1, wherein the deformation sensing unit includes a piezoelectric element.

12. The flexible display apparatus of claim 1, further comprising an amplifier between the deformation sensing unit and the control unit, the amplifier amplifying information sensed by the deformation sensing unit.

13. The flexible display apparatus of claim 1, further comprising an analog-to-digital (A/D) converter that is disposed between the deformation sensing unit and the control unit, the A/D converter converting information sensed by the deformation sensing unit into digital information.

14. The flexible display apparatus of claim 1, wherein the control unit and the resolution adjusting unit are integrally formed.

15. The flexible display apparatus of claim 1, further comprising a memory that stores information related to resolution adjustment of the resolution adjusting unit, the memory being connected to the control unit or the resolution adjusting unit.

16. The flexible display apparatus of claim 1, wherein the deformation sensing unit is on a predetermined area of a surface of the substrate.

17. The flexible display apparatus of claim 1, wherein the deformation sensing unit is on an opposite surface of the substrate from a surface of the substrate on which an image is displayed.

18. The flexible display apparatus of claim 1, further comprising a touch panel that is disposed to face the substrate, the touch panel being flexible.

19. The flexible display apparatus of claim 1, wherein the display area includes a first electrode, a second electrode, and an intermediate layer disposed between the first electrode and the second electrode, the intermediate layer including an organic emissive layer.

20. The flexible display apparatus of claim 19, wherein the display area further comprises a thin film transistor that is electrically connected to the first electrode and includes an active layer, a gate electrode, a source electrode, and a drain electrode.

21. The flexible display apparatus of claim 19, wherein:
the display area further comprises a thin film transistor that is electrically connected to the first electrode and includes an active layer, a gate electrode, a source electrode, and a drain electrode, and
the first electrode is on the same layer as the gate electrode.

22. The flexible display apparatus of claim 1, wherein the display area includes a liquid crystal layer.

23. A flexible display apparatus, comprising:
a substrate that is flexible and is foldable according to an intention of a user, the substrate including a display area, wherein a size of the substrate is variable according to a folding thereof;
a deformation sensing unit that is in an overlapping relationship with the display area and that senses deformation of the substrate, wherein the deformation sensing unit has a single form, the deformation sensing unit having variable widths along a direction perpendicular to an edge of the substrate, and the widths varying according to regions of the substrate;
a control unit obtaining information from the deformation sensing unit; and
a resolution adjusting unit that is controlled by the control unit and that adjusts a resolution of an image displayed on the display area.

24. The flexible display apparatus of claim 23, wherein the widths of the deformation sensing unit gradually increase in a predetermined direction from one corner to another corner of the edge of the substrate.

25. The flexible display apparatus of claim 23, wherein the deformation sensing unit corresponds to an edge of the substrate and another edge adjacent to the edge.

26. The flexible display apparatus of claim 25, wherein the deformation sensing unit corresponds to a corner of the substrate and another corner that is opposite to the corner.

\* \* \* \* \*